(No Model.)
C. T. TOLIVER & P. RUFFIN.
ODOR REMOVING DEVICE FOR COOKING STOVES.
No. 486,550. Patented Nov. 22, 1892.
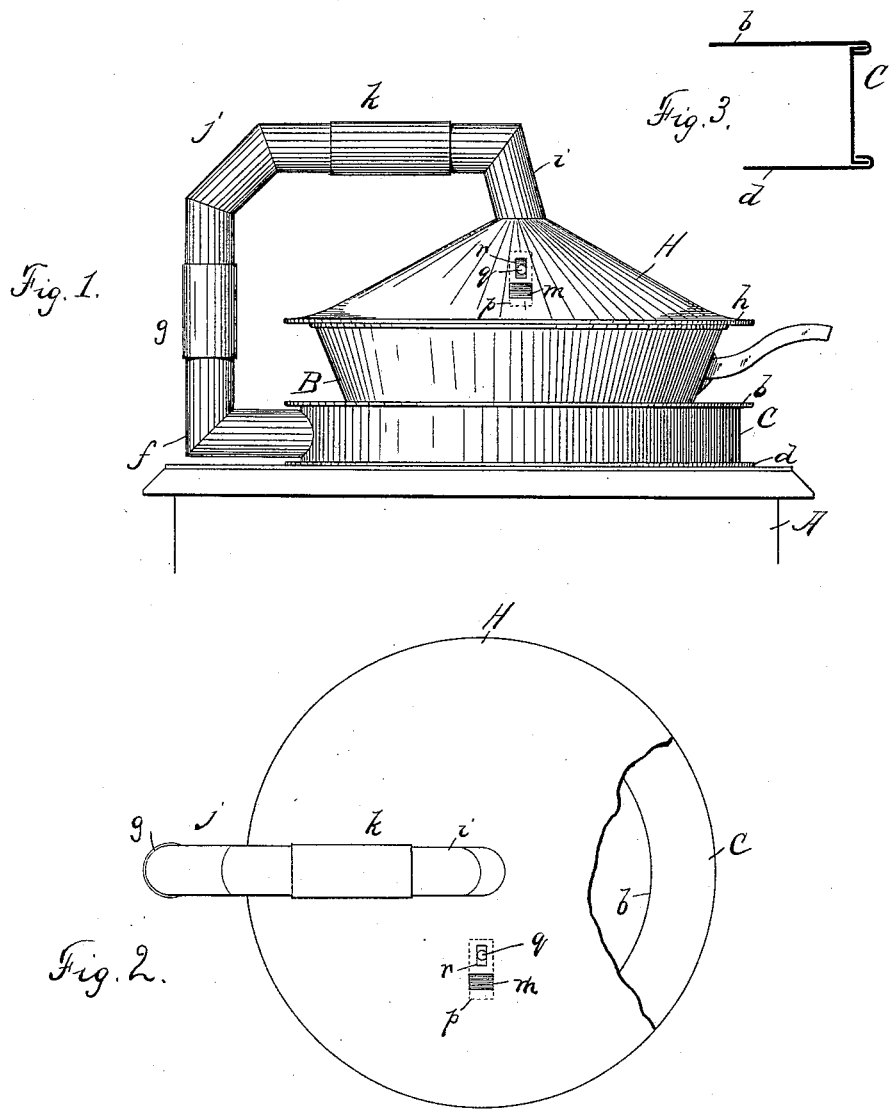

UNITED STATES PATENT OFFICE.

CHARLES T. TOLIVER AND POWHATTAN RUFFIN, OF BOSTON, MASSACHUSETTS.

ODOR-REMOVING DEVICE FOR COOKING-STOVES.

SPECIFICATION forming part of Letters Patent No. 486,550, dated November 22, 1892.

Application filed June 6, 1892. Serial No. 435,635. (No model.)

*To all whom it may concern:*

Be it known that we, CHARLES T. TOLIVER and POWHATTAN RUFFIN, both of Boston, in the county of Suffolk, State of Massachusetts, have invented certain new and useful Improvements in Odor-Removing Devices for Cooking Utensils, of which the following is a description sufficiently full, clear, and exact to enable any person skilled in the art or science to which said invention appertains to make and use the same, reference being had to the accompanying drawings, forming part of this specification, in which—

Figure 1 is a side elevation showing a portion of a cook-stove with our improvement in use with a fry-pan; Fig. 2, a plan view of the device, and Fig. 3 a sectional view of the supporting-ring.

Like letters of reference indicate corresponding parts in the different figures of the drawings.

Our invention relates to a device for supporting cooking utensils on a cook-stove and conveying the odor of the cooking food into the stove; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation:

In the drawings, A represents the stove, and B the fry-pan.

The device comprises an annulus C, provided at its top and bottom with horizontal annular flanges $b\ d$, fitting it, to rest on the top of the stove and support the pan B or other utensil. The annulus is of sufficient diameter to encircle the ordinary stove-hole. An elbow-pipe $f$ opens through the annulus, its outer end turning vertically and being provided with a sleeve $g$. A cone-shaped cover H has its base edge flanged horizontally at $h$ to engage the top edge of the cooking-pan. An elbow-pipe $i$ opens through the apex of the cover. A connecting-pipe $j$, bent at suitable angle, has one end fitted to enter the sleeve $g$, its opposite end being provided with a sleeve $k$ to receive the outer end of the cover-pipe. The joints formed by the sleeves are fitted sufficiently tight to enable the cover to be swung laterally, adjusted vertically, and sustained in such position. In use the annulus is disposed on the stove around the pot-hole. The pan or kettle B is placed on the upper flange $b$ thereof in the same manner as it would be adjusted on such hole. The cover is then swung into position over the top of the utensil and adjusted so that it closes the same tightly. The steam and odors arising from the cooking food in the pan passes through the pipes $i\ j\ f$ downward under the pan into the stove. As the cover may fit too closely to afford a suitable draft, we provide a draft-opening $m$ therein, closed by a plate $p$, which has a stud $q$, sliding in a slot $r$ in said cover, whereby the size of the opening may be regulated. This form of damper or any other suitable to effect a draft through the tubes may be employed.

The heated air and steam will pass into the tubes in manner described and the cold air will be drawn into the opening $m$, preventing the odors from escaping through said opening. The cover may be disconnected by detaching the tube $j$ from its companion tube.

Having thus explained our invention, what we claim is—

The combination, with the annulus C, provided with the horizontal flanges $b\ d$, of the tube $f$, opening horizontally through a wall thereof, the cover H, provided with the draft-opening and damper, the tube $i$, opening through the apex of said cover, and the elbow-tube $j$, detachably connecting the tubes $f\ i$, all being arranged to operate substantially as described.

CHARLES T. TOLIVER.
POWHATTAN RUFFIN.

Witnesses:
O. M. SHAW,
K. DURFEE.